United States Patent
Nam et al.

(10) Patent No.: US 8,941,572 B2
(45) Date of Patent: Jan. 27, 2015

(54) LIQUID CRYSTAL PANEL AND LIQUID CRYSTAL DISPLAY DEVICE HAVING THE SAME

(75) Inventors: Chul Nam, Gyeongbuk (KR); Seung Ho Heo, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 500 days.

(21) Appl. No.: 12/461,773

(22) Filed: Aug. 24, 2009

(65) Prior Publication Data

US 2010/0073273 A1    Mar. 25, 2010

(30) Foreign Application Priority Data

Sep. 23, 2008    (KR) .................. 10-2008-0093152

(51) Int. Cl.
*G09G 3/36* (2006.01)
*G02F 1/1362* (2006.01)

(52) U.S. Cl.
CPC .................. *G02F 1/136286* (2013.01)
USPC ........................................... 345/92

(58) Field of Classification Search
CPC ............. G02F 1/136213; G02F 1/136286; G02F 2001/134345; G02F 1/1343; G02F 1/136; G02F 3/038; H01L 27/13; H01L 27/1214; G09G 5/00; G09G 3/36
USPC .......................... 345/92, 204; 349/79, 96, 209
See application file for complete search history.

(56) References Cited

U.S. PATENT DOCUMENTS

2009/0040407 A1* 2/2009 Kim .............................. 349/39

FOREIGN PATENT DOCUMENTS

KR    10-2004-0041811 A1    5/2004

* cited by examiner

*Primary Examiner* — Tony N Ngo
(74) *Attorney, Agent, or Firm* — McKenna Long & Aldridge LLP

(57) ABSTRACT

A liquid crystal panel with an improved picture-quality and an LCD device having the same are disclosed. The liquid crystal panel and the LCD device allows a distance between a pixel electrode and a data line not connected to a thin film transistor and another distance between the pixel electrode and another data line to be asymmetrically formed within a single pixel region. Accordingly, the vertical cross-talk can be minimized, and furthermore picture-quality can be improved.

11 Claims, 9 Drawing Sheets

LIQUID CRYSTAL PANEL AND LIQUID CRYSTAL DISPLAY DEVICE HAVING THE SAME

CROSS-REFERENCE TO RELATED APPLICATION

This application claims priority under 35 U.S.C. 119 to Korean Patent Application No. 10-2008-0093152, filed on Sep. 23, 2008, which is hereby incorporated by reference in its entirety.

BACKGROUND

1. Field of the Disclosure

This disclosure relates to a liquid crystal display (LCD) device, and more particularly to a liquid crystal panel improving picture-quality through the minimization of vertical cross-talk phenomenon, and an LCD device having the same.

2. Description of the Related Art

In general, LCD devices control the light transmittance of a liquid crystal in order to display an image. To this end, LCD devices include a liquid crystal panel with a matrix of pixel regions and a drive unit for driving the liquid crystal panel.

A plurality of gate lines and a plurality of data lines are arranged to cross each other on the liquid crystal panel. These perpendicularly crossing gate and data lines define the pixel regions.

Also, a common electrode and plural pixel electrodes to be applied to each of the pixel regions are formed on the liquid crystal panel. Each of the pixel electrodes is connected to the respective data line via the source and drain electrodes of a thin film transistor which is employed as a switching element. The thin film transistor is turned on by a scan pulse applied to its gate electrode through the respective gate line. This in turn charges the pixel electrode through a data signal on the respective data line. These thin film transistors can be arranged in a zigzag shape on the liquid crystal panel.

The LCD device as configured above can be driven in a one-dot inversion system, a column inversion system, a line inversion system, or a z-inversion system, among others. If an LCD device driven in the z-inversion system displays a pattern consisting of a central portion of black and a peripheral portion of gray on the liquid crystal pane, the data lines positioned in the central portion of the liquid crystal panel have loads larger than those in its peripheral portions, as black data signals are applied to the central portion of the liquid crystal panel. This result in the generation of a difference between leakage currents caused by the data lines positioned the central and peripheral portions of the liquid crystal panel.

Such a difference between the leakage currents induces the generation of a vertical cross-talk along the data line. As a result, the picture-quality of the LCD device is deteriorated.

SUMMARY OF THE INVENTION

Accordingly, the present embodiments are directed to an LCD device that substantially obviates one or more of problems due to the limitations and disadvantages of the related art.

An object of the present embodiment is to provide a liquid crystal panel minimizing the vertical cross-talk by reducing the leakage current difference between its data lines, and an LCD device having the same.

Another object of the present embodiment is to provide a liquid crystal panel with an improved picture-quality, and an LCD device having the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a liquid crystal panel includes: a plurality of gate lines; a first data line crossing the plural gate lines to define pixel regions and electrically connected to a thin film transistor within each of the pixel regions; a second data line formed adjacently to the first data line and not to electrically connected to the thin film transistor; and a pixel electrode electrically connected to a drain electrode of the thin film transistor and formed to partially overlap with the second data line.

A liquid crystal panel according to another general aspect of the present embodiment includes: a plurality of gate lines; a first data line crossing the plural gate lines to define pixel regions and electrically connected to a thin film transistor within each of the pixel regions; a second data line formed adjacently to the first data line and not electrically connected to the thin film transistor; and a pixel electrode electrically connected to a drain electrode of the thin film transistor and formed to partially overlap with the second data line.

An LCD device according to still another general aspect of the present embodiment includes: a liquid crystal panel including a plurality of gate lines, a first data line crossing the plural gate lines to define pixel regions and electrically connected to a thin film transistor within each of the pixel regions, a second data line formed adjacently to the first data line and not electrically connected to the thin film transistor, and a pixel electrode electrically connected to a drain electrode of the thin film transistor and formed to partially overlap with the second data line; a gate driver applying a scan signal to the plural gate lines; and a data driver supplying the first and second data lines with video signals of different polarities.

An LCD device according to further still another general aspect of the present embodiment includes: a liquid crystal panel including a plurality of gate lines, a first data line crossing the plural gate lines to define pixel regions and electrically connected to a thin film transistor within each of the pixel regions, a second data line formed adjacently to the first data line and not electrically connected to the thin film transistor, and a pixel electrode electrically connected to a drain electrode of the thin film transistor and formed to be separated from the first and second data line by asymmetric distances; a gate driver applying a scan signal to the plural gate lines; and a data driver supplying the first and second data lines with video signals of different polarities.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
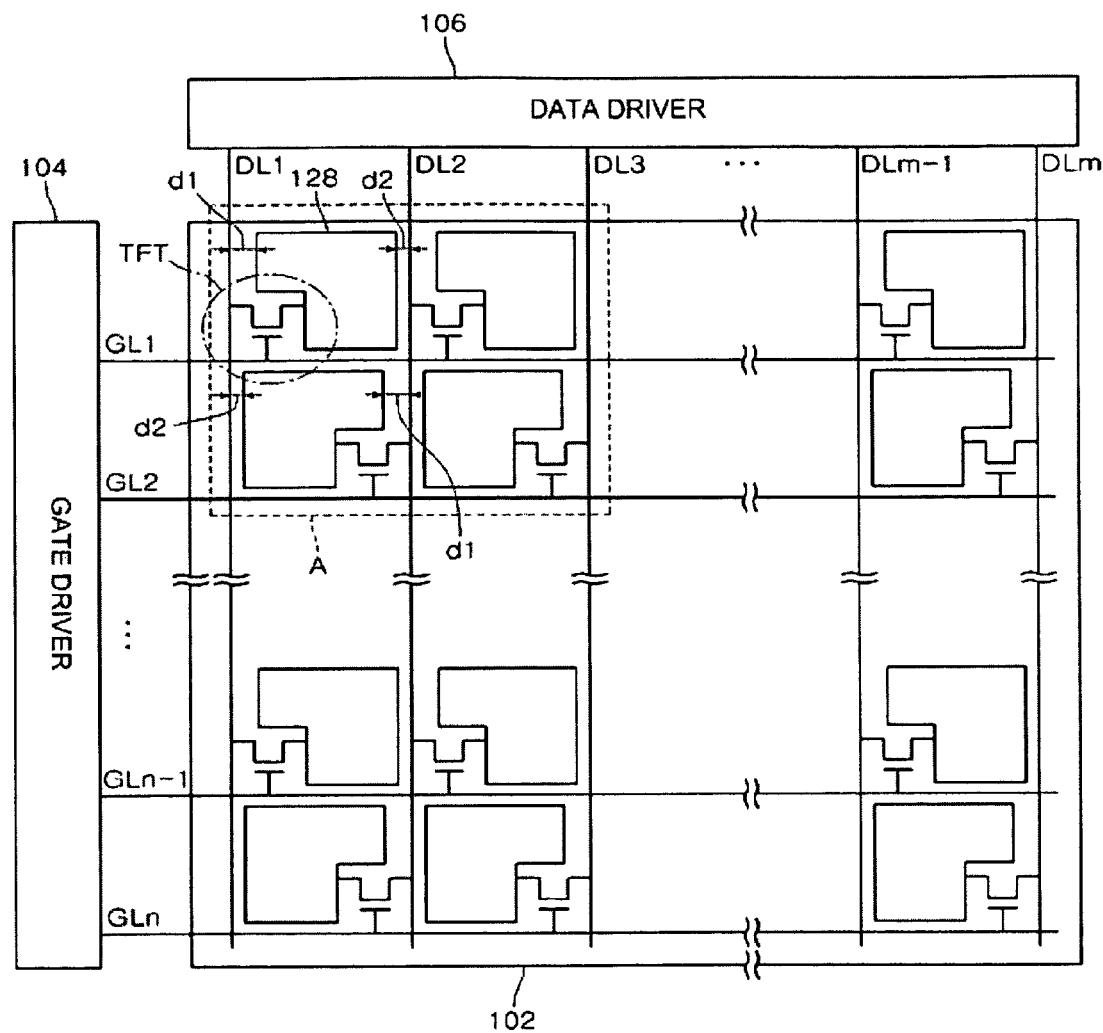
FIG. 1 is a view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a view showing an LCD device according to an embodiment of the present disclosure. As shown in FIG. 1, the LCD device of the present embodiment includes a liquid crystal panel 102 on which liquid crystal cells are arranged in a matrix shape, as well as a gate driver 104 for driving gate lines GL1~GLn on the liquid crystal panel 102, and a data driver 106 for driving data lines DL1~DLm on the liquid crystal panel 102.

The plural gate lines GL1~GLn and the plural data lines DL1~DLm on the liquid crystal panel 102 cross each other and define a plurality of pixel regions. The pixel regions each include a thin film transistor TFT.

The thin film transistors TFT are arranged in a zigzag shape along the data lines DL1~DLm. As such, liquid crystal cells each positioned in the respective pixel regions are connected to the respective data lines DL1~DLm. In other words, the liquid crystal cells in the same column are alternately connected to adjacent the different data lines, along a y-axis direction For example, odd-numbered thin film transistors TFT connected to odd-numbered gate lines GL1, GL3, . . . , GLn-1 are connected to the first through m-1th data lines DL1, DL3, . . . , DLm-1. On the contrary, even-numbered thin film transistors TFT connected to odd-numbered gate lines GL1, GL3, . . . , GLn-1 are connected to second through mth data lines DL2, DL4, . . . , DLm.

Such thin film transistors TFT respond to scan signals from the respective gate lines GL1~GLn and selectively apply data signals from the respective data lines DL1~DLm to the respective liquid crystal cells. Each of the liquid crystal cells drives the liquid crystal between a pixel electrode and a common electrode, adjusting the light transmittance of the liquid crystal.

The gate driver 104 sequentially supplies the gate lines GL1~GLn with the scan signal in order to drive the thin film transistors TFT connected to the respective gate line GL.

The data driver 106 converts video data for one horizontal line into video signals which are analog signals. Also, the data driver 106 applies the video signals for one horizontal line to the data lines DL1~DLm during one horizontal synchronous period during which the scan signal is applied to the gate line GL. In this case, the data driver 106 applies the video signals to the data lines DL1~DLm in a column inversion system.

More specifically, the data driver 106 supplies an odd-numbered data line and an even-numbered data line with video signals which have polarities contrary to each other during one frame period. Also, the data driver 106 either originally applies the video signals or shifts the video signals to the right side by one channel before applying them during every horizontal synchronous period, in order to apply the video signals to the liquid crystal cells arranged zigzag according to the data lines. In other words, the data driver 106 is driven in the column inversion system, and applies the video signals, in their original location or after shifting to the right by one channel, every horizontal synchronous period, thereby driving the liquid crystal cells arranged zigzag according to the data lines DL1~DLm in a dot-inversion system.

Figure 2:
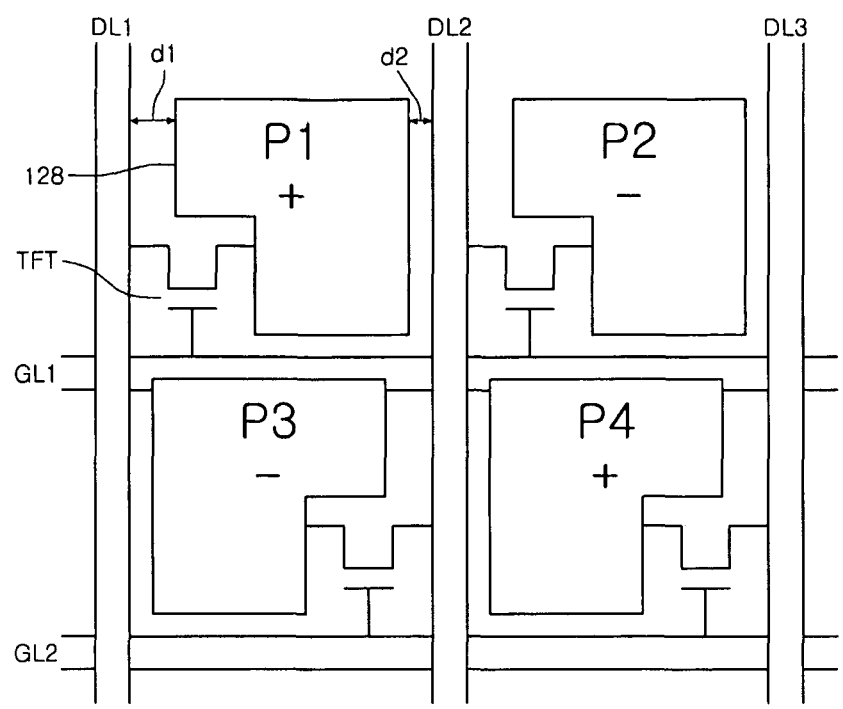
FIG. 2 is a view showing a circuitry of portion "A" in FIG. 1.
Figure 3:
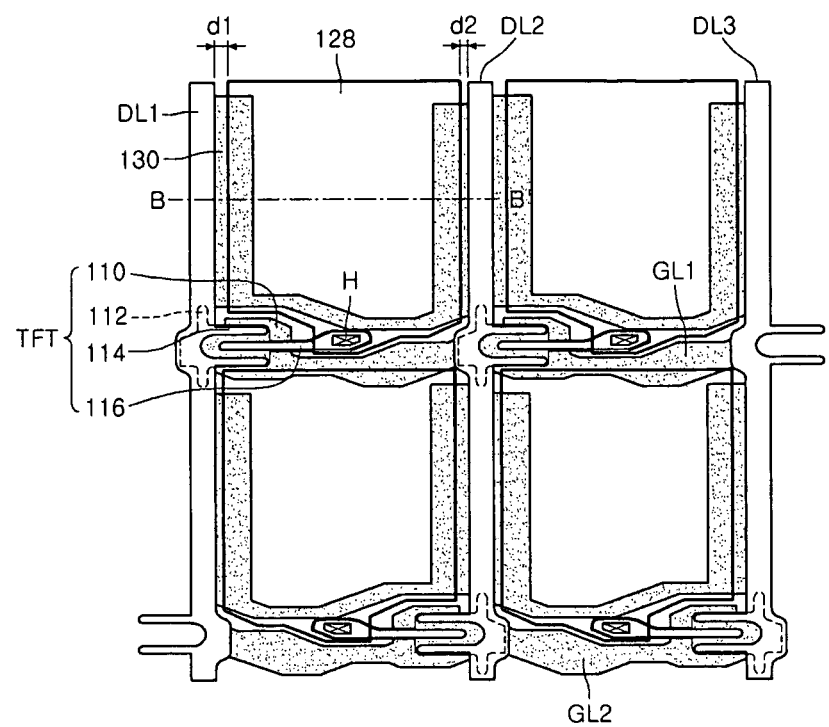
FIG. 3 is a view showing a detail portion "A" in FIG. 1.

FIG. 2 is a view showing a circuitry of the portion "A" in FIG. 1. FIG. 3 is a view showing in detail the portion "A" in FIG. 1. As shown in FIGS. 2 and 3, first to fourth pixel regions P1 to P4 are defined by means of first and second gate lines GL1 and GL2 and first to third data lines DL1 to DL3 crossing the gate lines GL1 and GL2.

More specifically, the first pixel region P1 is defined by the first gate line GL1 and the first and second data lines DL1 and DL2 crossing the first gate DL1. The second pixel region P2 is defined by means of the first gate line GL1 and the second and third data lines DL2 and DL3 crossing the first gate line GL1. Similarly, the third pixel region P3 is defined by means of the second gate line GL2 and the first and second data lines DL1 and DL2. The fourth pixel region P4 is defined by means of the second gate line GL2 and the second and third data lines DL2 and DL3 crossing the second gate line GL2.

On each of the first to fourth pixel regions P1 to P4, a thin film transistor TFT and a pixel electrode 128 connected thereto are formed. A common electrode 130 is formed on each of the first to fourth pixel regions P1 to P4. Although the common electrode 130 is formed in a "U" shape on each of the first to fourth pixel regions P1 to P4 as shown in drawing, the common electrode 130 can be modulated in a variety of shapes as long as it forms an electric field together with the pixel electrode 128. The thin film transistor TFT formed on the first pixel region P1 is electrically connected to the first data line DL1. The thin film transistors each TFT formed on the second and third pixel regions P2 and P3 are electrically connected to the second data line DL2. The thin film transistor TFT formed on the fourth pixel region P4 is electrically connected to the third data line DL3.

As described above, the transistors TFT connected to the first gate line GL1 are connected to the first and second data lines DL1 and DL2 directly to the left of the pixel electrodes 128. On the other hand, the transistors TFT connected to the second gate line GL2 connected to the second and third data lines DL2 and DL3 directly to the right of the pixel electrodes 128.

The pixel electrodes 128 formed on the third and fourth pixel regions P3 and P4 are overlapped by the first gate line GL1. The pixel electrodes 128 formed on the first and second pixel regions P1 and P2 are not overlapped by any gate lines because no gate line is formed on the top area adjacent to the top edges of the first and second pixel regions P1 and P2.

Each of the thin film transistors formed on the first to fourth pixel regions P1 to P4 includes a gate electrode 110 formed to protrude from the respective gate line GL, an active layer 112 formed to overlap with the gate electrode 110, as well as source and drain electrodes 114 and 116 formed opposite the active layer 112. The source electrode 114 is formed to protrude from the respective data line DL, and the drain electrode 116 is electrically connected to the respective pixel electrode 128 through a contact hole H. Although the active layer 112 is formed in an island structure opposite to the source and drain electrodes 114 and 116 as shown in drawing, the active layer 112 can be formed to overlap with part of the respective gate line GL from which the gate electrode 110 protrudes, in order to compensate a parasitic capacitor Cgs caused between the gate and source electrodes 110 and 114 of the thin film transistor TFT.

Figure 4A:
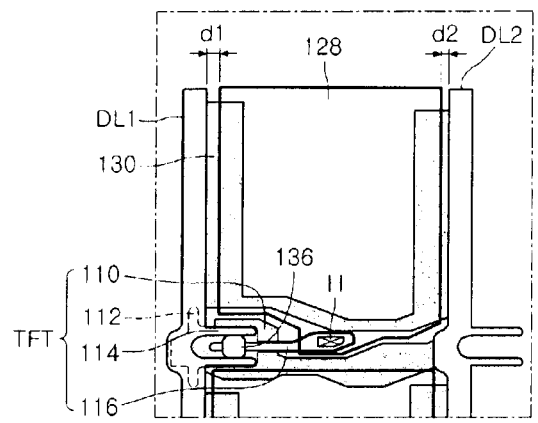
FIGS. 4A and 4B are views showing a column spacer included in the LCD device of FIG. 1.
Figure 4B:
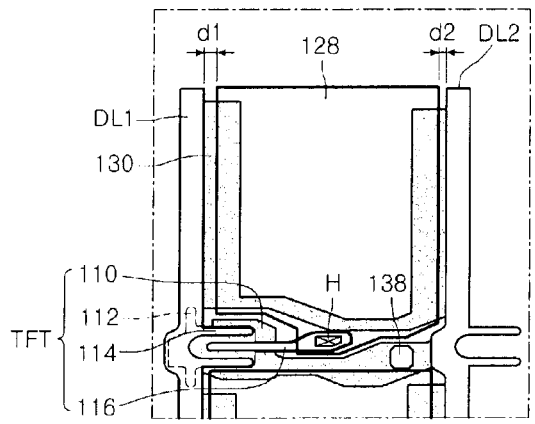

An array substrate (not shown) with such thin film transistors TFT formed on it is combined with a color filter substrate (not shown) including color filters and a black matrix (not shown). A liquid crystal layer (not shown) is formed between the array substrate and the color filter substrate. In this case, a first column space 136 shown in FIG. 4A is formed on the color filter substrate opposite to each of the thin film transistors TFT, in order to maintain a cell gap between the array substrate and the color filter substrate. In addition, second column spacers 138 are formed on the color filter substrate opposite to parts of the gate lines GL.

As the first column spacer 136 is a column spacer maintaining the cell gap, it is formed on the color filter substrate of a suitable size to contact with the thin film transistor TFT. The first column spacers 136 are arranged in a zigzag pattern on the color filter substrate because they are formed opposite the thin film transistors TFT.

The second column spacers 138 are formed on the color filter substrate opposite to the gate line GL of a suitable size to be separated from the array substrate by the thickness of the thin film transistor (i.e., a coverage step caused by the formation of the thin film transistor TFT). As such, the second column spacers 138 can maintain the cell gap between the array substrate and the color filter substrate, even though the liquid crystal panel including the combined array and color filter substrates is pressed by an external force.

The pixel electrodes 128 connected to the odd-numbered data lines DL1, DL3, . . . , DLm-1 and the pixel electrodes 128 connected to the even-numbered data lines DL2, DL4, . . . , DLm receive the video signal having different polarities, as described above. Accordingly, the pixel electrodes 128 on the first and fourth pixel region P1 and P4 connected to the first and third data lines DL1 and DL3 receive video signals of a positive polarity (+), while the pixel electrodes 128 on the second and third pixel regions P2 and P3 connected to the second data line DL2 receive video signals of a negative polarity (−).

The pixel electrodes 128 on the first to fourth pixel regions P1 to P4 are formed to be separated from the adjacent data lines DL1 and DL2 by a fixed distance. For the convenience of explanation, the pixel electrodes 128 on the first pixel region P1 and the first and second data lines DL1 and DL2 adjacent thereto will be described in detail.

Figure 5:
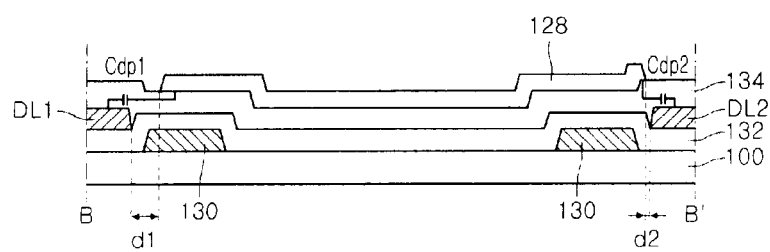
FIG. 5 is a cross-sectional view showing a sectional surface taken along the line B-B' of FIG. 3.

FIG. 5 is a cross-sectional view showing a sectional surface taken along the line B-B' of FIG. 3. As shown in FIG. 5, a common electrode 130 is formed on a substrate 100, and an insulation layer 132 is formed on the substrate 100 with the common electrode 130. On the substrate 100 with the insulation layer 132, first and second data lines DL1 and DL2 are formed. Also, a passivation (or protective) layer 134 is formed on the substrate 100 with the first and second data lines DL1 and DL2, and a pixel electrode 128 is formed on the passivation layer 134.

A first parasitic capacitor Cdp1 may be generated between the first data line DL1 and the pixel electrode 128, and a second parasitic capacitor Cdp2 may be generated between the second data line DL2 and the pixel electrode 128. In this case, a capacitance difference (or deviation) can be generated between the first and second capacitors Cdp1 and Cdp2 because the distance (hereinafter, "first distance d1") between the first data line DL1 and the pixel electrode 128 is not the same as the distance (hereinafter, "second distance d2") between the second data line DL2 and the pixel electrode 128. Such a capacitance difference caused by the deviation of the first and second distances d1 and d2 can be explained by the following equation.

$$Q_1 = \frac{W \cdot d}{\rho \cdot L} \times (V_{data(+)} - V_{pxl}) \int_0^{1\,frame} dt \qquad [\text{Equation 1}]$$

$$Q_2 = CdpL \cdot V_{(Data(-)-pxl)}$$

In this equation, "$Q_1$" is the first electric charge quantity, "W" is the width of the channel layer, "d" is the thickness of a-Si:H, "$\rho$" is the resistivity of the thin film transistor TFT, and "$Q_2$" is the second electric charge quantity.

The first electric charge quantity $Q_1$ corresponds to a quantity of electric charges caused by the leakage of current from the thin film transistor TFT, and the second electric charge quantity $Q_2$ refers to a quantity of electric charges caused by the parasitic capacitor Cdp existing between the data line DL and the pixel electrode 128.

In the case of the first pixel region P1, the second electric charge quantity $Q_2$ becomes a quantity of electric charges by means of the second parasitic capacitor Cdp2 existing between the pixel electrode 128 and the second data line DL2. The first electric charge quantity $Q_1$ is determined by the width of the channel layer and the thickness of a-Si:H in the active layer 112 of the thin film transistor TFT as well as the resistivity of the thin film transistor TFT.

If the first and second electric charge quantities $Q_1$ and $Q_2$ are equal to each other, a variation of the video signal, which is charged in the pixel electrodes 128 of the first pixel region P1 by the leakage of current from the transistor TFT, is offset (or is compensated) by a coupling phenomenon of the pixel electrodes 128 with the second data line DL2. This results from the fact that the video signal applied to the second data line DL2 has a polarity contrary to that of the video signal charged in the pixel electrode 128. Accordingly, the affect of the leakage current applying to the charged video signal in the pixel electrode 128 of the first pixel region P1 can be minimized.

In view of this point, the first and second parasitic capacitors Cdp1 and Cdp2 must be designed in such a manner as to enable the first electric charge quantity $Q_1$ to be the same as the second electric charge quantity $Q_2$. The capacitances of the first and second parasitic capacitors Cdp1 and Cdp2 may be appropriately determined by the first distance d1 between the first data line DL1 and the pixel electrode 128 and the second distance d2 between the second data line DL2 and the pixel electrode 128.

Actually, the first and second distances d1 and d2 are asymmetrically determined so that the capacitance of the first parasitic capacitor Cdp1 is smaller than that of the second parasitic capacitor Cdp2. On the other hand, the second distance d2 can be narrowed in comparison with the first distance d1 in order to allow the capacitance of the second parasitic capacitor Cdp2 to be larger than that of the first parasitic capacitor Cdp1. As such, the second electric charge quantity of the second parasitic capacitor Cdp2 corresponds (or is equal) to the first electric charge quantity caused by the leakage current of the thin film transistor TFT. Therefore, the leakage current of the thin film transistor TFT can be minimized.

In this manner, the liquid crystal panel of the present embodiment enables the first electric charge quantity caused by the leakage current of the thin film transistor TFT to be equal to the second electric charge quantity charged in the second parasitic capacitor Cdp2. This second parasitic capacitor Cdp2 is located between the pixel electrode 128 and the second data line DL2 which receives a video signal of a different polarity to that on the first data line DL1. Accordingly, the liquid crystal panel can minimize the leakage current of the thin film transistor TFT.

Furthermore, as the leakage current of the thin film transistor TFT is minimized, the LCD device of the present embodiment can prevent the cross-talk phenomenon generated by the leakage current difference between the pixel regions, even though it is driven in the z-inversion system.

On the other hand, if the first distance d1 between the first data line DL1 and the pixel electrode 128 and the second distance d2 between the second data line DL2 and the pixel electrode 128 are asymmetrically designed, difficulties arise in the manufacturing process due to design deviations.

Figure 6:
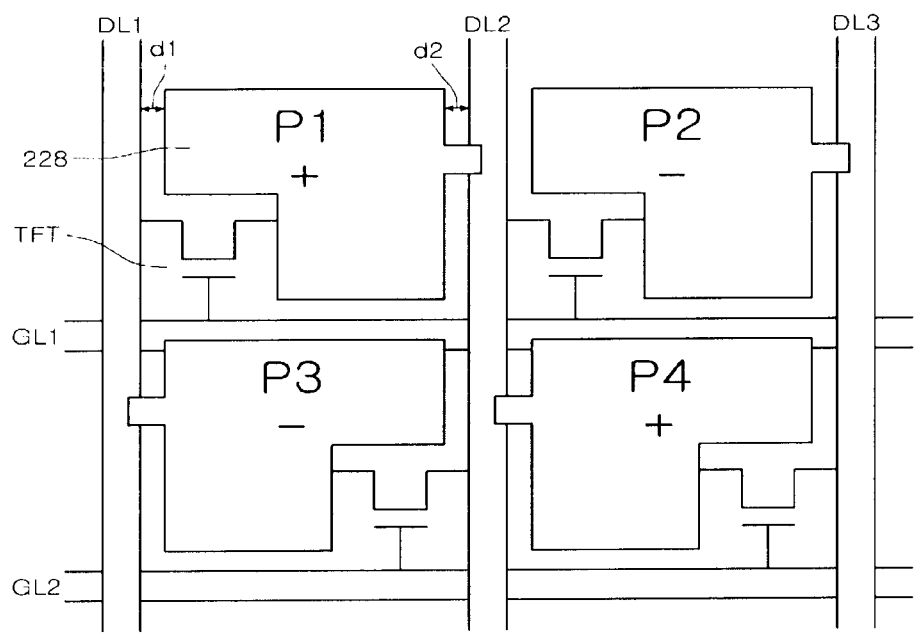
FIG. 6 is a circuit diagram showing another embodiment of the pixel regions shown in FIG. 1.
Figure 7:
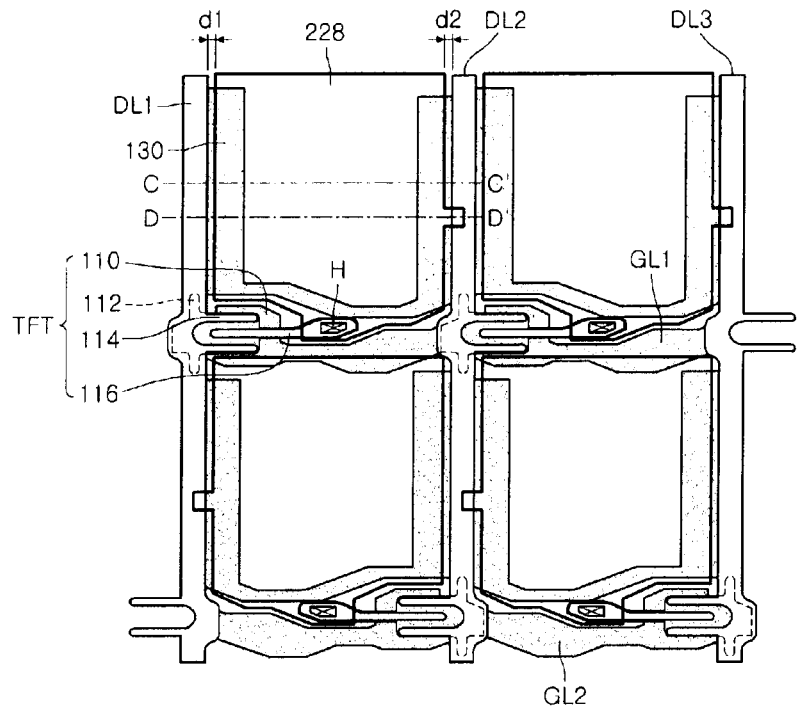
FIG. 7 is a view showing in detail a lay-out of the pixel regions shown in FIG. 6.

FIG. 6 is a circuit diagram showing another embodiment of the pixel regions shown in FIG. 1. FIG. 7 is a view showing in detail a lay-out of the pixel region shown in FIG. 6. First to fourth pixel regions P1 to P4 shown in FIGS. 6 and 7 have the same configuration as those shown FIGS. 2 and 3 with the exception of pixel electrodes 228. The pixel electrodes 228 are overlapped by the data line DL which is not connected to the respective thin film transistor TFT. The components of FIGS. 6 and 7 having the same title, function, operation, and effect as those of FIGS. 2 and 3 are referred to by the same reference numbers. Also, the overlapping function, operation and effect information with regards to the components of FIGS. 6 and 7 will be omitted because it is easily understood from the description of FIGS. 2 and 3.

The pixel electrodes 228 are formed on the first to fourth pixel regions P1 to P4, respectively. Also, each of the pixel electrodes 228 is partially overlapped by the data line DL which is not connected to the thin film transistor TFT formed on the respective pixel region P1~P4.

More specifically, the pixel electrode 228 on the first pixel region P1 is partially overlapped by the second data line DL2, and the pixel electrode 228 on the second pixel region P2 is partially overlapped by the third data line DL3. On the contrary, the pixel electrode 228 on the third pixel region P3 is partially overlapped by the first data line DL1, and the pixel electrode 228 on the fourth pixel region P4 is partially overlapped by the second data line DL2.

For the convenience of explanation, the first pixel region P1 will be explained in detail.

The pixel electrode 228 formed on the first pixel region P1 is separated by the first distance d1 from the first data line formed on its left as well as by the second distance d2 from the second data line DL2 formed on its right. Also, the pixel electrode 228 on the first pixel region P1 is partially overlapped by the second data line DL2. The first distance d1 is formed to be the same as the second distance d2. As such, a capacitance difference between a first parasitic capacitor Cdp1 existing between the pixel electrode 228 and the first data line DL1 and a second parasitic capacitor Cdp2 existing between the pixel electrode 228 and the second data line DL2 is generated.

Figure 8:
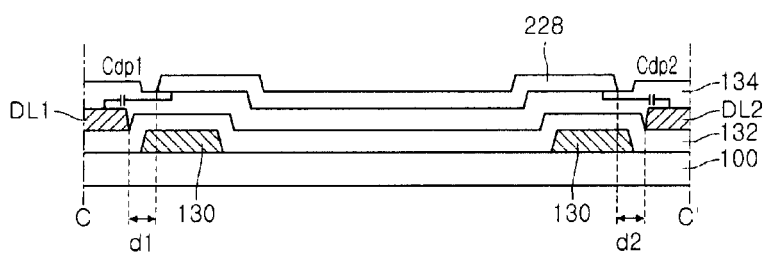
FIG. 8 is a cross-sectional view showing a sectional surface taken along the line C-C' of FIG. 7.

FIG. 8 is a cross-sectional view showing a sectional surface taken along the line C-C' of FIG. 7. Referring to FIGS. 7 and 8, the first data line DL1 and the pixel electrode 228 are separated from each other by the first distance d1, and the second data line DL2 and the pixel electrode 228 are separated from each other by the second distance d2. The first and second distances are equal to each other.

In other words, the first data line DL1 formed on the left of the pixel electrode 228 and the second data line DL2 formed on the right of the pixel electrode 228 are symmetrically arranged at the same distance. Accordingly, if the pixel electrode 228 is not overlapped by the second data line DL2, the first parasitic capacitor Cdp1 generated between the first data line DL1 and the pixel electrode 228 may have the same capacitance as the second parasitic capacitor Cdp2 generated between the second data line DL2 and the pixel electrode 228.

Figure 9:
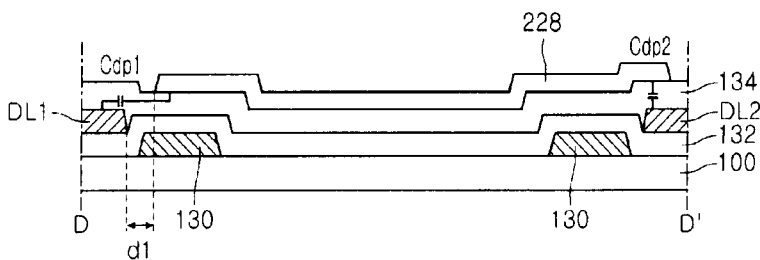
FIG. 9 is a cross-sectional view showing a sectional surface taken along the line D-D' of FIG. 7.

FIG. 9 is a cross-sectional view showing a sectional surface taken along the line D-D' of FIG. 7. As shown in FIGS. 7 and 9, the first data line DL1 and the pixel electrode 228 are separated from each other by the first distance d1. On the other hand, the pixel electrode 228 is formed extending to a portion of the second data line DL2 and is overlapped by this portion of the second data line DL2. In accordance therewith, a capacitance difference is generated between the first parasitic capacitor Cdp1, existing between the first data line DL1 and the pixel electrode 228, and the second parasitic capacitor Cdp2, existing between the second data line DL2 and the pixel electrode 228.

In addition to partially overlapping the pixel electrode 228 with the second data line DL2, the pixel electrode 228 can be separated from the first and second data lines DL1 and DL2 by the same distance. In other words, the first and second data lines DL1 and DL2 and the pixel electrode 228 can be designed in such a manner that the first distance d1 between the first data line DL1 and the pixel electrode 228 is the same as the second distance d2 between the second data line DL2 and the pixel electrode 228. As the pixel electrode 228 is partially overlapped by the second data line DL2, the second parasitic capacitor Cdp2 generated between the second data line DL2 and the pixel electrode 228 has a large capacitance in comparison with the first parasitic capacitor Cdp1 generated between the first data line DL1 and the pixel electrode 228. Accordingly, the second electric charge quantity of the second parasitic capacitor Cdp2 corresponds (or is equal) to the first electric charge quantity caused by the leakage current of the thin film transistor TFT. As a result, the leakage current of the thin film transistor TFT can be minimized.

In this way, the liquid crystal panel of the present embodiment enables the first electric charge quantity caused by leakage current of the thin film transistor TFT to be equal to the second electric charge quantity charged in the second parasitic capacitor Cdp2. This second parasitic capacitor Cdp2 is located between the pixel electrode 228 and the second data line DL2 which receives a video signal of a different polarity to that on the first data line DL1. Accordingly, the liquid crystal panel can minimize the leakage current of the thin film transistor TFT.

Furthermore, as the leakage current of the thin film transistor TFT is minimized, the LCD device of the present embodiment can prevent the cross-talk phenomenon generated by the leakage current difference between the pixel regions, even though it is driven in the z-inversion system.

Figure 10:
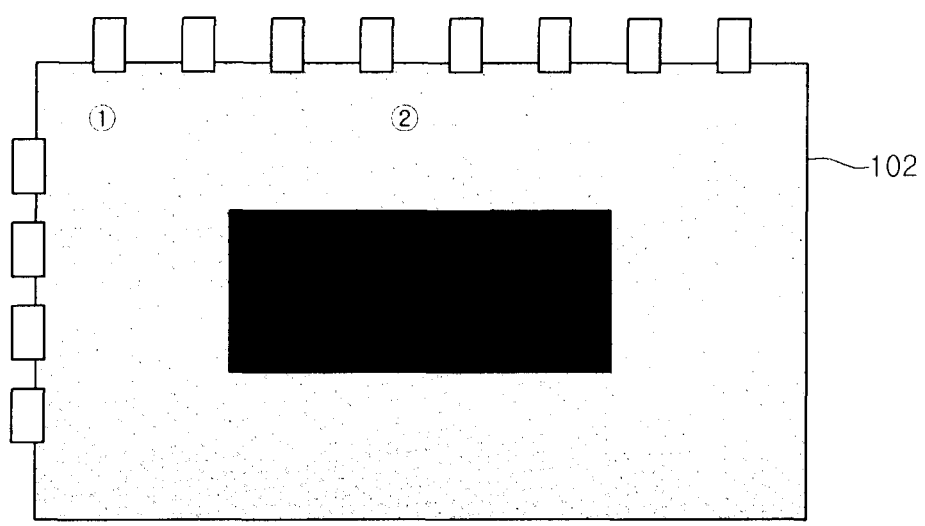
FIG. 10 is a view showing a liquid crystal panel in which a pattern for testing for cross-talk is displayed.

As shown in FIG. 10, black is displayed on the central portion of a liquid crystal panel 102 with plural pixel regions designed in such a manner that the pixel electrodes 228 partially overlap with data lines DL not connected to the respective thin film transistor TFT. Gray (or gray color) is displayed on the peripheral portion of the liquid crystal panel 102 without the central portion. In this case, the video signals of gray are applied to the data lines DL formed on the peripheral portion of the liquid crystal panel 102, and the video signals of black are applied to the data lines DL formed on the central portion of the liquid crystal panel 102.

Figure 11:
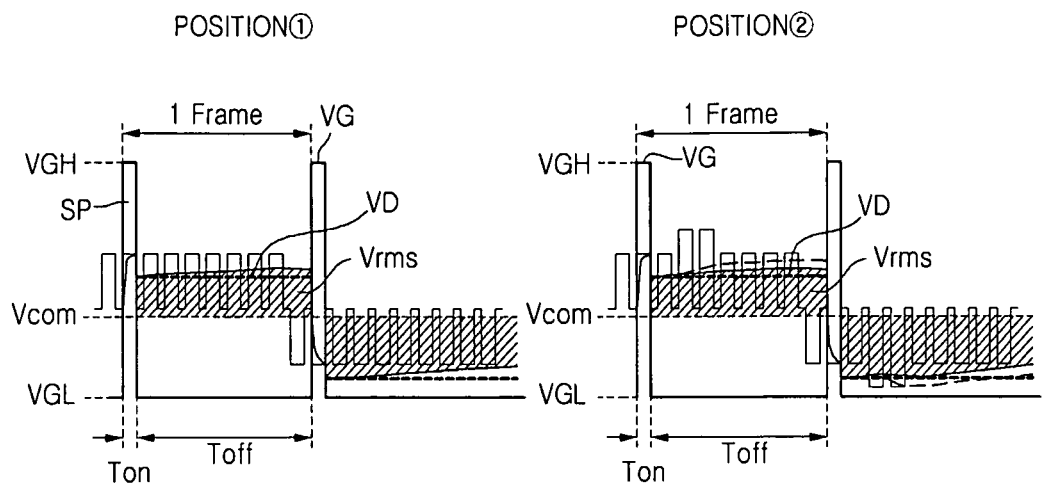
FIG. 11 is a waveform diagram showing drive voltages for the liquid crystal panel of FIG. 10.

FIG. 11 is a waveform diagram showing drive voltages for the liquid crystal panel of FIG. 10. As shown in FIG. 11, a scan signal SP is sequentially applied to the gate lines GL arranged on the liquid crystal panel 102, activating the thin film transistor TFT connected to the respective gate line GL. As such, the data lines DL positioned at a first area □ of the liquid crystal panel 102 repeatedly apply video signals of gray to the respective pixel electrodes 228, while the data lines DL positioned at a second area □ of the liquid crystal panel 102 alternately apply the video signals of gray and black to the respective pixel electrodes 228. Accordingly, black is displayed on the central portion of the liquid crystal panel 102, and gray is displayed on the peripheral portion of the liquid crystal panel 102 and is exempt from its central portion. Like this case, as shown in FIG. 11, a Vrms value of the first area □ of the liquid crystal panel 102 and a Vrms value of the second area □ of the liquid crystal panel 102 became similar. This is due to the fact that the distances between the pixel electrode and the data lines on its left and right within one pixel region are asymmetrically formed, the electric charge quantity of the leakage current caused by the thin film transistor TFT within one pixel region and the electric charge quantity charged in the parasitic capacitor existing between the pixel electrode and the data line DL not connected to the transistor become similar. Thereby, the leakage current of the thin film transistor TFT of the liquid crystal panel 102 is minimized. Thereafter, the leakage current difference generated between the thin film transistor TFT of the first area □ and the thin film transistor TFT of the second area □ become similar, the Vrms value of the first area □ and the Vrms value of the second area □ become similar.

When such a pattern is displayed, the liquid crystal panel of the related art generates a leakage current difference between the thin film transistor connected to the data line DL which receives the video signal of black, and the thin film transistor connected to the data line DL which receives the video signal of gray. In the end, vertical cross-talk is generated in the area to which the video signals of black are applied.

On the other hand, the liquid crystal panel of the present embodiment enables the electric charge quantity of the leakage current caused by the thin film transistor TFT within one pixel region to be equal to the electric charge quantity charged in the parasitic capacitor existing between the pixel electrode and the data line not connected to the transistor. Accordingly, the liquid crystal panel can minimize the leakage current of the thin film transistor. This is due to the fact that the distances between the pixel electrode and the data lines on its left and right are asymmetrically formed. This asymmetry generates a capacitance difference between the parasitic capacitors which are located between the pixel electrode and the data lines on its the left and right within one pixel region.

In other words, the liquid crystal panel 102 of the present embodiment does not generate the leakage current difference between its first and second areas □ and □, even though the video signal of black is applied to its central portion. Therefore, the liquid crystal panel 102 of the present embodiment can prevent a picture-quality deterioration such as the vertical cross-talk.

Figure 12:
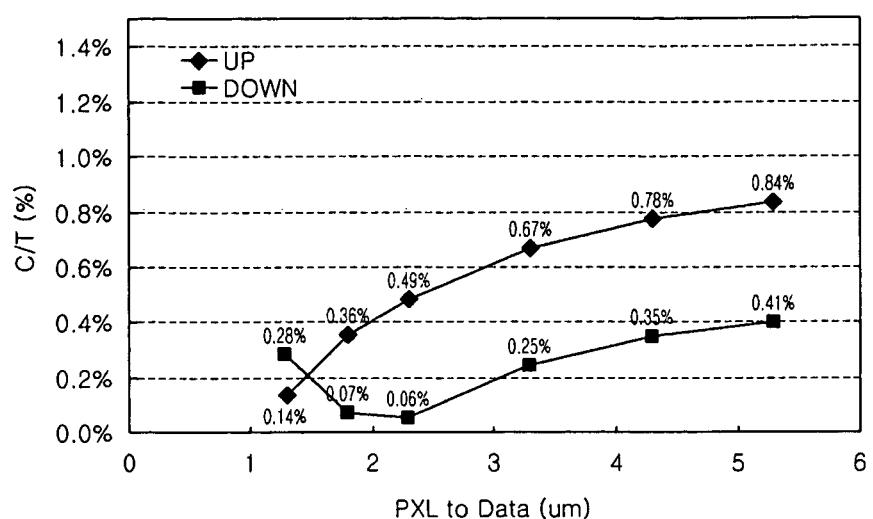
FIG. 12 is an experimental chart showing the cross-talk generation number along the interval between the pixel electrode and the data line which is not connected to the thin film transistor.

FIG. 12 is an experimental chart showing the cross-talk generation number along the interval between the pixel electrode and the data line which is not connected to thin film transistor. FIG. 12 shows variations of vertical cross-talk generation numbers when the distance between the pixel electrode and the data line is gradually increased and when the distance is gradually decreased.

When the distance between the pixel electrode and the data line not connected to the thin film transistor TFT within single pixel region is gradually increased, the vertical cross-talk (C/T) generation number increases. If the distance is gradually decreased, the vertical cross-talk (C/T) number in tern decreases. However, when the distance is decreased less than 1.4 µm, the vertical cross-talk (C/T) number again becomes high.

In view of this point, the distance between the pixel electrode and the data line not connected to the thin film transistor TFT within single pixel region can be appropriately determined on the basis of Equation 1 and the experimental figures. As such, the liquid crystal panel of the present embodiment may be designed in such a manner that the distances between the pixel electrode and the data lines on its left and right are within a single pixel region. Accordingly, the leakage current difference between the pixel regions can be minimized and furthermore the vertical cross-talk generation number can be minimized.

As described above, the liquid crystal panel and LCD device with the same according to an embodiment of the present disclosure asymmetrically form the distances between the pixel electrode and the data lines on its left and right, greatly reducing the leakage current difference between the data lines. Accordingly, the vertical cross-talk phenomenon can be minimized. Also, the liquid crystal panel and the LCD device can improve picture-quality.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal panel comprising:
    a plurality of odd-numbered gate lines and even-numbered gate lines;
    a plurality of odd-numbered data lines and even-numbered data lines;
    the plurality of the data lines crossing the plurality of the gate lines to define pixel regions;
    odd-numbered thin film transistors TFT connected to the odd-numbered gate lines are connected to odd-numbered data lines, even-numbered thin film transistors TFT connected to odd-numbered gate lines are connected to even-numbered data lines; and odd-numbered pixel electrodes electrically connected to a drain electrode of the odd-numbered the thin film transistors TFT; and formed to partially overlap with the even-numbered data lines;

wherein the odd-numbered pixel electrodes are not formed to overlap with the odd-numbered data lines;

even-numbered pixel electrodes electrically connected to a drain electrode of the even-numbered the thin film transistors TFT and formed to partially overlap with the odd-numbered data lines;

wherein the even-numbered pixel electrodes are not formed to overlap with the even-numbered data lines;

odd-numbered thin film transistors TFT connected to the even-numbered gate lines are connected to even-numbered data lines, even-numbered thin film transistors TFT connected to even-numbered gate lines are connected to odd-numbered data lines; and odd-numbered pixel electrodes electrically connected to a drain electrode of the odd-numbered thin film transistors TFT and form a protrusion to partially overlap with the odd-numbered data lines and a cut-away at the bottom to avoid overlapping with the odd-numbered thin film transistors TFT;

wherein the odd-numbered pixel electrodes are not formed to overlap with the even-numbered data lines;

even-numbered pixel electrodes electrically connected to a drain electrode of the even-numbered thin film transistors TFT and form a protrusion to partially overlap with the even-numbered data lines by the same amount as the protrusion of the odd-numbered pixel electrodes partially overlapping with the odd numbered data lines, wherein the even-numbered pixel electrodes comprise a cut-away at the bottom to avoid overlapping with the even-numbered thin film transistors TFT, wherein the even-numbered pixel electrodes are not formed to overlap with the odd-numbered data lines;

wherein capacitors formed between the pixel electrodes and the data lines not overlapped with the pixel electrodes have a smaller capacitance than that of capacitors formed between the pixel electrodes and the data line partially overlapped with the pixel electrodes, wherein the odd-numbered data line formed on the left of the odd-numbered pixel electrodes and the even-numbered data line formed on the right of the odd-numbered pixel electrodes are symmetrically arranged at the same distance.

2. The liquid crystal panel according to claim 1, wherein the pixel electrodes are separated from the odd-numbered data lines and even-numbered data lines at the same distance, except for the overlapped portions.

3. The liquid crystal panel according to claim 1, wherein capacitors formed between the pixel electrodes and the data lines not overlapped with the pixel electrodes have a capacitance different from that of capacitors formed between the pixel electrodes and the data lines partially overlapped with the pixel electrodes.

4. The liquid crystal panel according to claim 1, wherein the thin film transistors are connected to the plurality of the data lines and arranged in a zigzag shape in the pixel regions.

5. A liquid crystal display device comprising:

a plurality of odd-numbered gate lines and even-numbered gate lines;

a plurality of odd-numbered data lines and even-numbered data lines;

the plurality of the data lines crossing the plurality of the gate lines to define pixel regions;

odd-numbered thin film transistors TFT connected to the odd-numbered gate lines are connected to odd-numbered data lines, even-numbered thin film transistors TFT connected to odd-numbered gate lines are connected to even-numbered data lines;

odd-numbered pixel electrodes electrically connected to a drain electrode of the odd-numbered the thin film transistors TFT and formed to partially overlap with the even-numbered data lines;

wherein the odd-numbered pixel electrodes are not formed to overlap with the odd-numbered data lines;

even-numbered pixel electrodes electrically connected to a drain electrode of the even-numbered the thin film transistors TFT and formed to partially overlap with the odd-numbered data lines;

wherein the even-numbered pixel electrodes are not formed to overlap with the even-numbered data lines;

odd-numbered thin film transistors TFT connected to the even-numbered gate lines are connected to even-numbered data lines, even-numbered thin film transistors TFT connected to even-numbered gate lines are connected to odd-numbered data lines; and odd-numbered pixel electrodes electrically connected to a drain electrode of the odd-numbered thin film transistors TFT and form a protrusion to partially overlap with the odd-numbered data lines and a cut-away at the bottom to avoid overlapping with the odd-numbered thin film transistors;

wherein the odd-numbered pixel electrodes are not formed to overlap with the even-numbered data lines;

even-numbered pixel electrodes electrically connected to a drain electrode of the even-numbered thin film transistors TFT and form a protrusion to partially overlap with the even-numbered data lines by the same amount as the protrusion of the odd-numbered pixel electrodes partially overlapping with the odd numbered data lines, wherein the even-numbered pixel electrodes comprise a cut-away at the bottom to avoid overlapping with the even-numbered thin film transistors TFT, wherein the even-numbered pixel electrodes are not formed to overlap with the odd-numbered data lines;

a gate driver applying a scan signal to the plurality of the gate lines; and a data driver supplying the plurality of odd-numbered data lines and even-numbered data lines with video signals of different polarities, wherein capacitors formed between the pixel electrodes and the data lines not overlapped with the pixel electrodes have a smaller capacitance than that of capacitors formed between the pixel electrodes and the data line partially overlapped with the pixel electrodes, wherein the odd-numbered data line formed on the left of the odd-numbered pixel electrodes and the even-numbered data line formed on the right of the odd-numbered pixel electrodes are symmetrically arranged at the same distance.

6. The liquid crystal display device according to claim 5, wherein the pixel electrodes are separated from the odd-numbered data lines and even-numbered data lines at the same distance, except for the overlapped portions.

7. The liquid crystal display device according to claim 5, wherein capacitors formed between the pixel electrodes and the data lines not overlapped with the pixel electrodes have a capacitance different from that of capacitors formed between the pixel electrodes and the data lines partially overlapped with the pixel electrodes.

8. The liquid crystal display device according to claim 5, wherein the thin film transistors are connected to the plurality of the data lines and arranged in a zigzag shape in the pixel regions.

9. The liquid crystal display device according to claim 5, wherein the pixel electrodes partially overlapped with even-numbered data lines receive the video signal of a positive polarity (+) and the pixel electrodes partially overlapped with odd-numbered data lines receive the video signal of a negative polarity (−).

10. The liquid crystal display device according to claim 5, wherein the pixel electrodes partially overlapped with even-numbered data lines receive the video signal of a negative polarity (−) and the pixel electrodes partially overlapped with odd-numbered data lines receive the video signal of a positive polarity (+).

11. The liquid crystal display device according to claim 1, wherein the pixel electrodes are disposed to overlap with only one of odd-numbered data lines and even-numbered data lines.

\* \* \* \* \*